United States Patent [19]

Barbier et al.

[11] 4,442,680

[45] Apr. 17, 1984

[54] PILOT-OPERATED PRESSURE REGULATOR VALVE

[75] Inventors: William J. Barbier; J. George Leimbach, both of St. Louis, Mo.

[73] Assignee: Sporlan Valve Company, St. Louis, Mo.

[21] Appl. No.: 371,127

[22] Filed: Apr. 23, 1982

Related U.S. Application Data

[63] Continuation of Ser. No. 202,462, Oct. 31, 1980, abandoned.

[51] Int. Cl.³ ............................................. F25B 41/04
[52] U.S. Cl. ................................... 62/217; 137/489.5
[58] Field of Search ............... 62/217; 137/489.5, 495; 236/85

[56] References Cited

U.S. PATENT DOCUMENTS

| | | | |
|---|---|---|---|
| 3,414,010 | 12/1968 | Sparrow | 137/495 |
| 3,435,626 | 4/1969 | Wile et al. | 62/217 X |
| 3,481,363 | 12/1969 | Ray | 137/495 |
| 3,525,355 | 8/1970 | Katchka | 137/495 X |
| 3,552,430 | 1/1971 | Love | 137/495 |
| 3,592,225 | 7/1971 | Graham et al. | 137/495 |
| 3,880,186 | 4/1975 | Turner et al. | 137/495 |

*Primary Examiner*—William E. Tapolcai
*Attorney, Agent, or Firm*—Cohn, Powell & Hind

[57] ABSTRACT

A pilot-operated pressured regulator valve includes a main valve for controlling refrigerant flow in a refrigeration suction line. A pilot valve which is responsive to evaporator pressure controls a flow of high pressure refrigerant to the main valve for modulating the main valve. A bleed is provided for bleeding the high pressure refrigerant from the main valve. A solenoid-actuated shut-off valve controls the bleed flow from the main valve. The shut-off valve is selectively closed for maintaining the high pressure refrigerant in the main valve for closing the main valve. A bleed flow of high pressure is provided to the main valve when the shut-off valve is closed in order to maintain the main valve closed.

4 Claims, 4 Drawing Figures

PILOT-OPERATED PRESSURE REGULATOR VALVE

This application is a continuation, of application Ser. No. 202,462, filed Oct. 13, 1980, now abandoned.

BACKGROUND OF THE INVENTION

This invention relates to a pilot-operated valve in general, and particularly to a valve for use in a refrigeration system which functions as a modulating valve and as a shut-off valve.

An evaporator pressure regulator is a back-pressure valve located between the evaporator and the compressor in the compressor suction line for controlling evaporator pressure at a relatively constant level in order to provide an approximate method of controlling cooling capacity of the refrigeration system. A refrigeration system back-pressure valve is disclosed in U.S. Pat. No. 3,303,664 which includes a main valve that is spring biased closed.

Any pressure drop in the suction line of a refrigeration system can be very detrimental to system efficiency; especially in low temperature systems where a pressure drop can considerably reduce the pumping efficiency of the compressor, and can also cause high discharge gas temperatures. Pressure drop in the suction line of a refrigerant system increases the electrical energy required to run the compressor at a given capacity. When a back-pressure valve is used in a suction line, it is important that only the minimum possible pressure drop occur across the valve in its full open position. It is therefore important that the valve be biased open so that suction line pressure is not required in order to overcome a closing spring bias force.

In multiple evaporator refrigeration systems, such as those commonly utilized in refrigerated cases for foods, it is desirable that individual evaporators be selectively shut-off so that they can be defrosted while at the same time other evaporators in the case remain in operation in order to maintain cool temperature in the refrigerated case. A valve which can function both as a modulating valve and as a shut-off valve can replace two individual valves for these purposes.

SUMMARY OF THE INVENTION

This pilot-operated pressure regulator valve provides a device which both subjects the refrigeration system to a minimal pressure drop when the valve is open, and operates as a shut-off valve for shutting off an individual evaporator in a multi-evaporator system.

The pilot-operated pressure regulator valve includes a pressure-actuated main valve. A pilot valve which is responsive to the refrigeration system pressure being regulated supplies the actuating pressure to the main valve. Means is provided to bleed the actuating pressure from the main valve. A bleed shut-off means is provided for selectively stopping the bleeding of actuating pressure from the main valve for shutting off the main valve. In one aspect of the invention, means supply actuating pressure to the main valve when the bleed shut-off means is closed for maintaining the main valve closed.

In one aspect of the invention, the pilot-operated pressure regulator valve includes a body having in inlet and an outlet interconnected by a passage for flow therethrough. The body inlet is connected to the outlet of the evaporator in the suction line while the body inlet is connected to the inlet of the compressor in the suction line. A main valve seat defines a main valve port in the passage, while a chamber is provided at one side of the main valve port in the valve body. A main valve means is movably mounted in the chamber for movement toward or away from the main valve seat to control flow through the main valve port. The main valve means divides the chamber into a first portion communicating with the main valve port on one side of the main valve means, and a second portion on the opposite side of the main valve means from the main valve port. The main valve means is subject to the pressure at the body inlet through the main valve port.

A first spring means tends to urge the main valve means toward an open position relative to the main valve port. A pilot valve seat defines a pilot valve port communicating with the second chamber portion. A pilot valve means is movably mounted for movement toward or away from the pilot valve seat to control flow through the pilot valve port.

A flexible motor element is operatively connected to the pilot valve means for moving the pilot valve means. A second spring means subjects one side of the flexible motor element to a predetermined pressure tending to move the pilot valve means to an open position relative to the pilot valve port. Means subject the other side of the flexible motor element to a pressure of the refrigerant upstream of the main valve port and tend to move the pilot valve means to the close position relative to the pilot valve port.

Means connect the high pressure outlet of the compressor to the second chamber, on the opposite side of the main valve means, through the pilot valve port for actuating the main valve means to control flow through the main valve port. Bleed means communicate with the second chamber portion for bleeding the high pressure from the second chamber portion for regulating the main valve port. Means selectively close the bleed means for retaining high pressure in the second chamber portion for closing the main valve port by the main valve means.

In one aspect of the invention, the bleed means communicates with the inlet of the compressor downstream of the main valve port. In another aspect of the invention, the means selectively closing the bleed means comprises a solenoid-actuated shut-off valve.

In one aspect of the invention, a second bleed means interconnects the high pressure outlet of the compressor and the second chamber portion. The second bleed means provides high pressure to the second chamber portion when the pilot valve means is closed. The second bleed means is a passage bypassing the pilot valve port when the pilot valve port is closed by the pilot valve means. When the solenoid valve is closed, the second bleed means provides high pressure to the second chamber portion to maintain the main valve means closed.

In one aspect of the invention, the passage of the second bleed means is in the pilot valve seat.

DESCRIPTION OF THE PREFERRED EMBODIMENT

Figure 4:
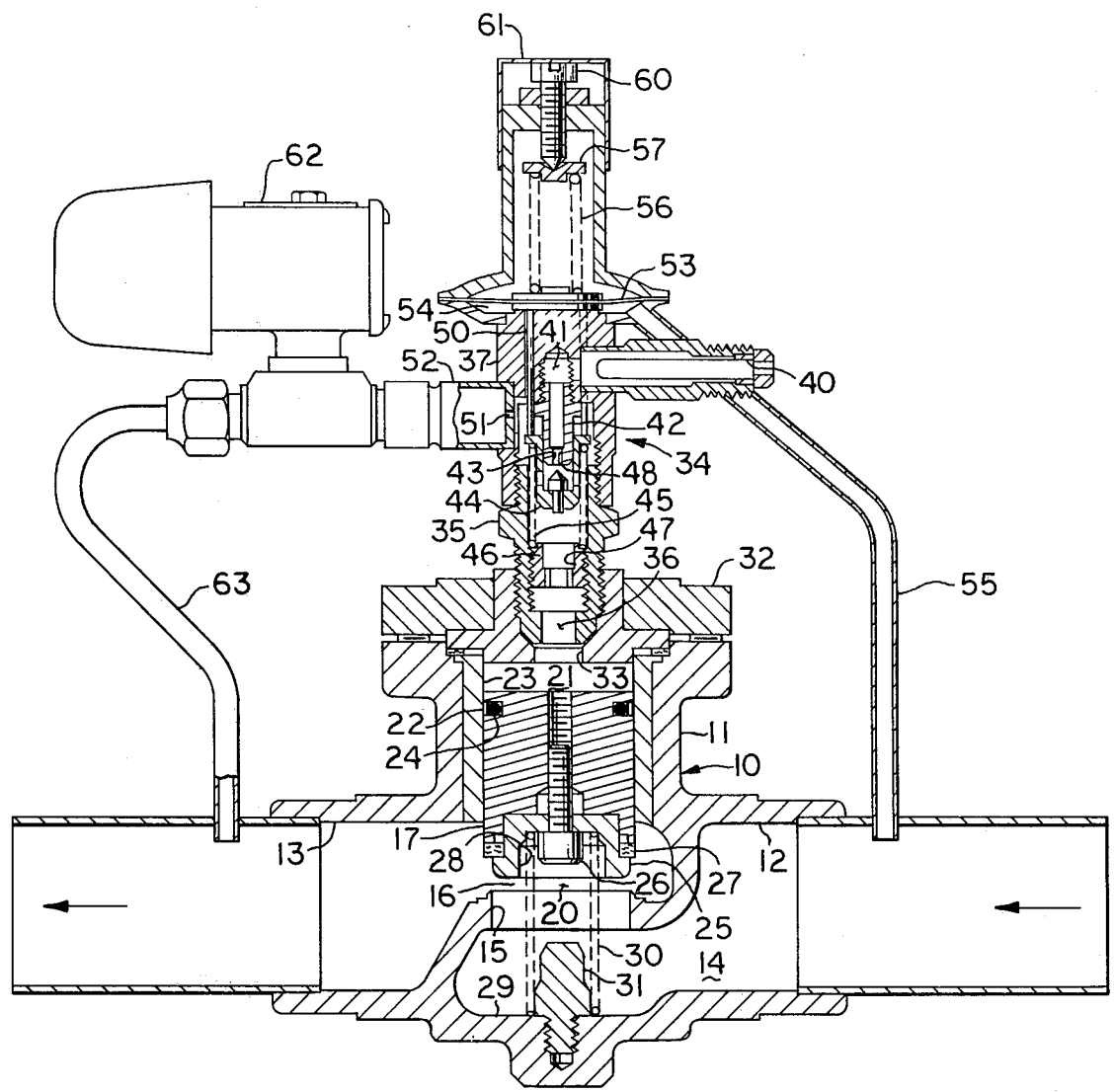
FIG. 4 is a cross-sectional view of the pilot-operated pressure regulator valve showing the pilot valve means open and the main valve means in a modulating position.

Referring now by characters of reference to the drawings and first to FIG. 4, it will be understood that the pressure regulator valve generally indicated by 10 includes a body 11 having an inlet 12 and an outlet 13 which are interconnected by a main body passage 14. A main valve port 15 is defined by a main valve seat in the passage 14.

Provided within the valve body 11, at one side of the main valve port 15, is a chamber 16. A piston 17, constituting a main valve means, is movably mounted in the chamber 16. The piston 17 divides the chamber 16 into a first lower portion 20 which is located on one side of the piston 17 and which communicates with the main valve port 15, and a second upper portion 21 on the opposite side of the piston 17 from the main valve port 15.

The piston 17 includes a Teflon ring 22 constituting a piston ring, and which is held against a cylinder wall 23 within the body 11 by the spring effect of an O-ring 24. The piston 17 slidably, sealably engages the cylinder wall 23. The diameter of the cylinder wall 23 is slightly larger than the diameter of the main valve port 15. The piston 17 includes a lower head portion 25 which is attached to the piston 17 by a bolt 26, the lower head portion 25 holding a seal 27 for sealing engagement with the main valve seat.

The piston lower head portion 25 includes a recess 28 for receiving a first spring 30, which constitutes a first spring means. The first spring 30 passes through the main valve port 15 and engages an end wall 29 of the body 11. A threaded retaining member 31 is threadably received by the body end wall 29 and retains the lower end of the first spring 30. The first spring 30 is a compression type spring that tends to urge the piston 17 toward an open position relative to the main valve port 15.

A head 32 is bolted to the body 11 for closing the second upper chamber portion 21 of the chamber 16. A passage 33 through the head 32 communicates with the second upper chamber portion 21. A pilot valve 34 communicates with the second chamber portion 21 through the passage 33.

Figure 2:
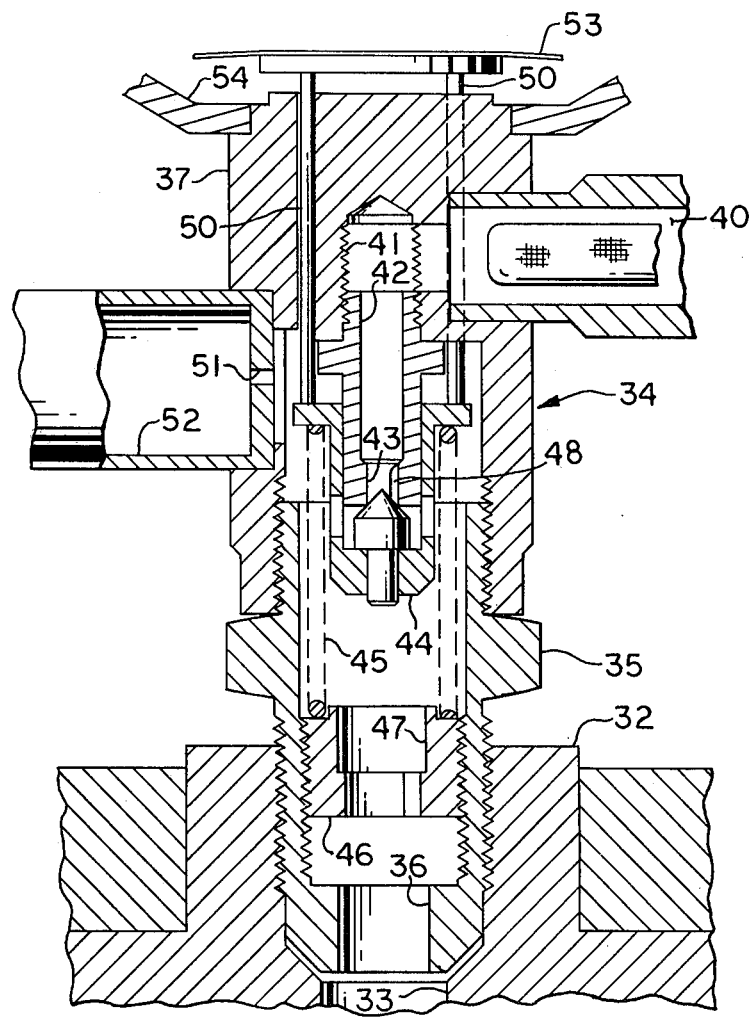
FIG. 2 is a fragmentary enlarged cross-sectional view of the pilot-operated pressure regulator valve of FIG. 3.

Referring now to FIG. 2 in which the pilot valve 34 is shown in greater detail, a pilot valve lower portion 35 is threadably received by the head 32. The lower portion 35 includes an internal passage 36 which communicates with the passage. 33. A pilot valve upper portion 37 is threadably received by the lower portion 35.

The upper portion 37 includes a pilot-valve inlet passage 40 and an internal body passage 41. Threadedly mounted internally to the upper portion 37 is a valve seat member 42 having an internal passage providing a valve port 43 defined by a pilot valve seat. A pilot valve member 44 constituting a pilot valve means is movably mounted within the pilot valve 34 for movement toward or away from the pilot valve port 43.

A slot 48 is provided in the pilot valve port 43. The slot 48 constituting second bleed means prevents the pilot valve member 44 from completely sealably closing the pilot valve port 43.

One end of a pilot valve spring 45 engages the pilot valve member 44 while the other end of the spring 45 engages a pilot spring-retaining member 46 which is threadably received within the lower portion 35. The pilot spring-retaining member 46 includes an internal passage 47 for providing a passage through the lower portion 35. The spring 45 is a compression type spring and tends to urge the pilot valve member 44 in an upward closing direction.

Attached to the pilot valve member 44 and extending through the upper portion 37 are a plurality of push rods 50, the push rods 50 applying a downward pressure to the pilot valve member 44 for opening the pilot valve port 43.

Referring again to FIG. 4, it will be seen that the push rods 50 are reciprocally carried by a flexible motor element 53 which is carried by the pilot valve upper portion 37. The lower side of the flexible motor element 53 and the upper portion 37 define a pressure chamber 54 which communicates with a pressure tube 55. A second spring 56 engages the flexible motor element 53 at one end for applying a downward pressure to the flexible motor element 53. A bolt 60 is threadably received through the upper end of the upper portion 37 and engages the spring element 57 for selectively adjusting the loading of second spring 56. A cap 61 encloses the head of the bolt 60.

Communicating with the lower portion passage 36 is a pilot valve orifice 51 constituting first bleed means, which communicates with the bleed tube 52. The bleed tube 52 is connected to a solenoid-operated shut-off valve 62. The outlet of the shut-off valve 62 communicates with the bleed outlet tube 63.

Figure 1:
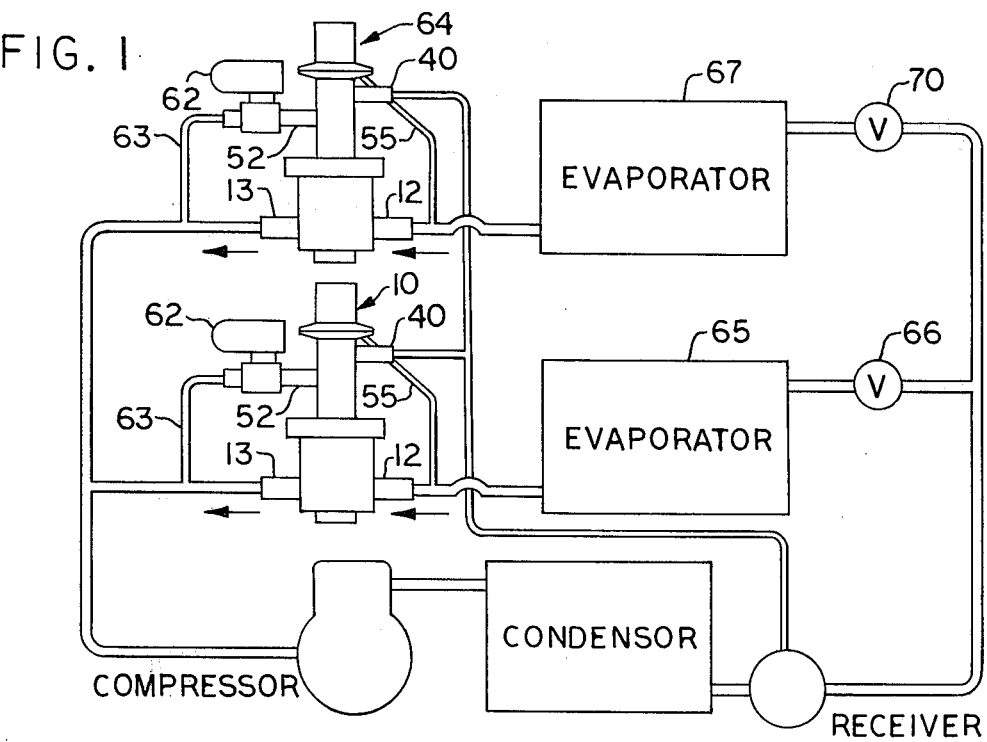
FIG. 1 is a schematic view of a multiple evaporator refrigeration system.

Referring now to FIG. 1, a multi-evaporator refrigeration system utilizing a pressure regulator valve 10 and a second identical pressure regulator valve 64, is shown. A compressor, condensor and receiver are serially connected, while a first evaporator 65 and first expansion valve 66 are serially connected across the system. A second evaporator 67 and second expansion valve 70 are serially connected in parallel with the first evaporator 65 and expansion valve 66. A source of high refrigerant pressure such as from the receiver is connected to the inlet passage 40 of the valves 10 and 64. The valve inlets 12 are connected to the outlets of their respective evaporators, while the valve outlets 13 are connected to the inlet of the compressor. The bleed outlet tubes 63 are connected to a low pressure point such as the inlet of the compressor downstream of the main valve port 15. The pressure chamber 54 of each valve 10 and 64 is operatively connected to the suction line at a point downstream of the associated evaporator 65 and 67 and upstream of the main valve port 15.

It is thought that the structural features and functional advantages of the pilot-operated pressure regulator valve have become apparent from the foregoing description of parts, but for completeness of disclosure a brief description of the operation of the valve will be given.

The multi-evaporator refrigeration system of FIG. 1 is a typical application for the pressure regulator valve 10. However, it is understood that the pressure regulator valve 10 can be used in single evaporator systems or systems employing any number of evaporators. In such an application, the pressure regulator valve 10 is utilized for controlling evaporator pressure.

Figure 3:
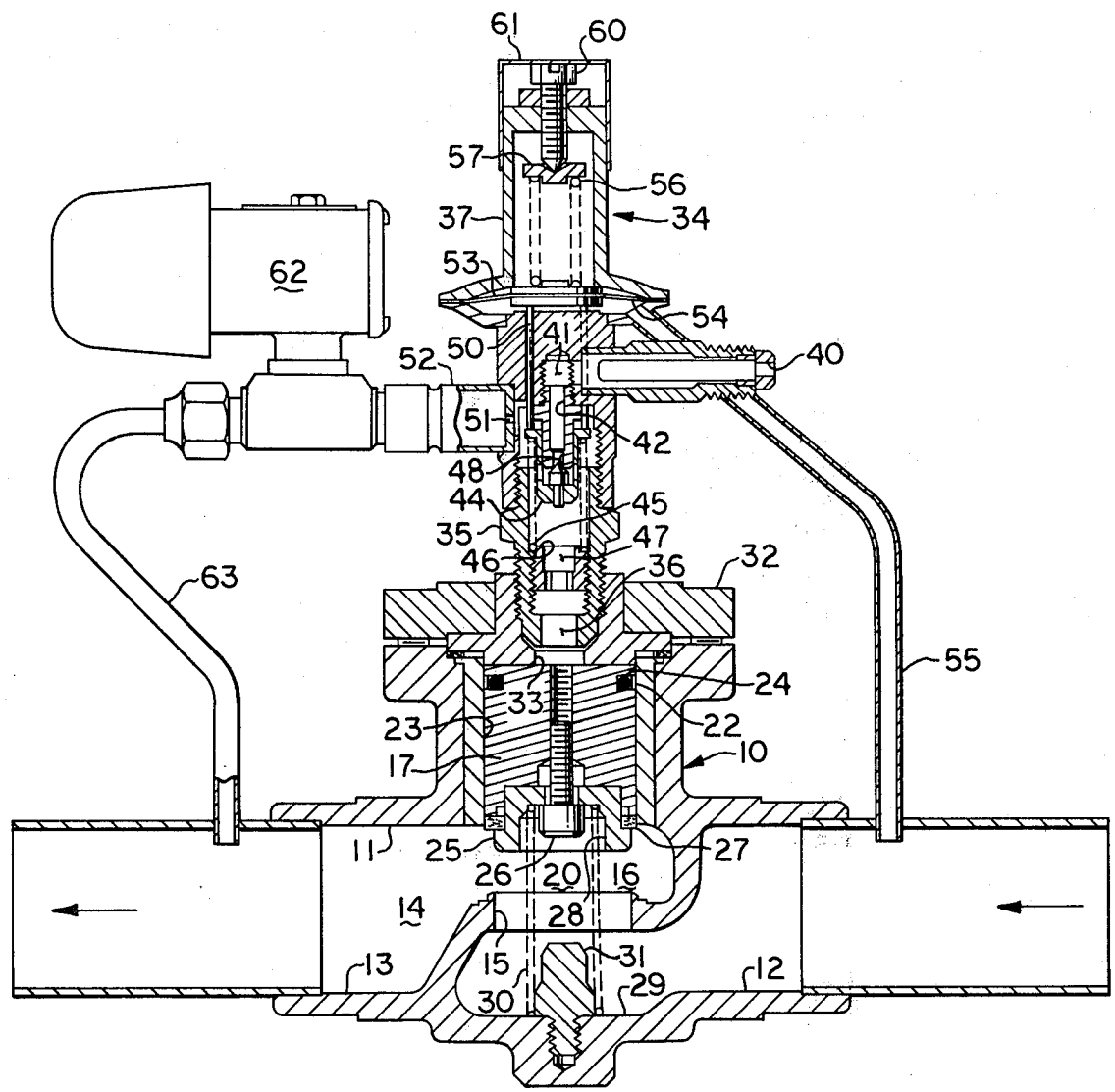
FIG. 3 is a cross-sectional view of the pilot-operated pressure regulator valve showing the pilot valve means closed and the main valve means open.

When regulating evaporator pressure the solenoid-actuated shut-off valve 62 is in an open condition for flow therethrough. Pressure upstream from the valve 10 is determined by the position of the piston 17 relative to the main valve port 15. In FIG. 3, the valve 10 is shown with the main valve port 15 fully opened. That is, the piston 17 is moved away from the main valve port 15. In FIG. 4, the piston 17 is in a position closer to the main valve port 15, thereby restricting the flow or refrigerant through the main valve port 15 to maintain a greater refrigerant pressure upstream of the valve than would be present if the valve 10 were fully open.

In the fully opened position shown in FIG. 3, minimal pressure drop across the valve 10 is obtained by utilizing the spring 13 to bias the piston 17 to an open position. Since the valve 10 is spring-biased open, the suction line refrigerant pressure is not utilized to overcome a spring loading.

Pressure regulation by the valve 10 is accomplished in the following manner. The pressure to be regulated, that is the evaporator pressure, is sensed in the suction line upstream of the valve 10. The pressure tube 55 interconnects the suction line with the pressure chamber 54 for actuating the flexible motor element 53. The flexible motor element 53 is connected by the push rods 50 to the pilot valve member 44.

High actuating pressure is supplied to the pilot valve 34 from the high pressure side of the refrigeration system. High pressure can be obtained at the condensor outlet, from the liquid line or as indicated in FIG. 1, from the receiver. High pressure refrigerant enters the pilot valve 34 through the inlet passage 40, body passage 41, and through valve seat member 42. When the valve port member 44 is moved away from the valve port 43, the high pressure refrigerant enters the internal passage 47, internal passage 36, and the head passage 33 to enter the second chamber portion 23. The high pressure refrigerant entering the second chamber portion 23 forces the piston 17 downward for restricting refrigerant flow through the main valve port 15.

In a combination modulating and shut-off valve of this type, it is important that the area of the piston 17 against which the high pressure refrigerant is acting be greater than the area of the main valve port 15 in order to close the valve.

However for modulating purposes, it is desirable that these areas be nearly equal to minimize the effect of the variation in pressure drop as the valve throttles. It has been found that piston to port area ratios from 1.18:1 to 1.3:1 will provide for good dual function operation of the valve 10.

At the same time the high pressure refrigerant is entering the chamber portion 23 through the pilot valve port 43, it is being bled from the chamber portion 23 through the passages 33, 36 and 47 and through the bleed orifice 51. The flow of bled refrigerant passes through the bleed tube 53, shut-off valve 62, and bleed outlet tube 63, and bleeds to a low pressure which in this embodiment is the suction line downstream of the valve 10.

The loading of the second spring 56 is adjusted by the bolt 60 for applying a predetermined pressure to the flexible motor element 53 for presetting the desired evaporator pressure. When the evaporator pressure is less than the preset pressure, the spring 56 forces the flexible motor element 53 downward as shown in FIG. 4, thereby causing the push rods 50 to move the pilot valve member 44 away from the valve port 43 for allowing high pressure refrigerant to force the piston 17 downward, thereby restricting suction line refrigerant flow through the main valve port 15 and causing the evaporator pressure to increase.

When the evaporator pressure is greater than the predetermined pressure, the evaporator pressure enters the chamber 54 through the pressure tube 55 and forces the flexible motor elemenyt 53 upward against the loading of the spring 56. The rods 50, attached to the flexible motor element 53, move the pilot valve member 44 upward to seat in the pilot valve port 43, thereby causing the pressure in the chamber 23 to bleed through the orifice 51 and causing the piston 17 to rise under the pressure of the first spring 30.

When it is desired to shut off the flow of refrigerant to an evaporator, the solenoid 62 is actuated to close the bleed tube 52. High pressure refrigerant entering the second chamber portion 23 through the pilot vavle 34 forces the piston 17 downward to seat in and close the main valve port 15. As the high pressure refrigerant in the chamber portion 23 now cannot bleed through the orifice 51, the main valve port 15 will remain closed. Over a period of time, the high pressure refrigerant within the second chamber portion 23 would dissipate as by leakage, therefore a bleed flow of high pressure refrigerant is provided to the second chamber portion 23. This bleed flow is provided through the slot 48 on the pilot valve port 43 which allows a flow of high pressure refrigerant to the second chamber portion 23 even when the pilot valve 34 is closed. This bleed flow does not affect the normal operation of the valve 10 because the bleed flow through the slot 48 is substantially less than the normal bleed flow through the orifice 51 when the valve 10 is modulating. When it is desired to allow flow through the evaporator, the solenoid 62 is actuated to open the bleed tube 52 and allow the trapped high pressure refrigerant in the second chamber portion 23 to bleed off, thereby allowing the piston 17 to move in an upward direction away from the main valve port 15, and allowing the flow of refrigerant in the suction line.

We claim as our invention:

1. A pilot-operated pressure regulator valve in a refrigeration system having a compressor, a condensor, an expansion valve and an evaporator connected in series, comprising:
    (a) a body having an inlet and an outlet interconnected by a passage for flow therethrough, the body inlet being connected to the outlet of the evaporator and the body outlet being connected to the inlet of the compressor,
    (b) a main valve seat defining a main valve port in the passage,
    (c) the valve body being provided with a chamber at one side of the main valve port,
    (d) a main valve means movably mounted in the chamber for movement toward or away from the main valve seat to control flow through the main valve port, and subject to the pressure at the body inlet through the main valve port, the main valve means dividing the chamber into a first portion communicating with the main valve port on one side of the main valve means and a second portion on the opposite side of the main valve means from the main valve port,
    (e) a first spring means tending to urge the main valve means toward an open position relative to the main valve port,
    (f) a pilot valve seat defining a pilot valve port communicating with the second chamber portion, (g) a pilot valve means movably mounted for movement toward or away from th pilot valve seat to control flow through the pilot valve port, (h) a flexible motor element operatively connected to the pilot valve means for moving the pilot valve means, (i) a second spring means subjecting one side of the flexible motor element to a predetermined pressure and tending to move the pilot valve means to an open position relative to the pilot valve port, (j) means subjecting the other side of the flexible motor element to a pressure of the refrigerant upstream of the main valve port, and tending to move the pilot valve means to a closed position relative to the pilot valve port, (k) means connecting the high pressure outlet of the compressor to the second chamber portion on the said opposite side of the main valve means through the pilot valve port for actuating the main valve means to control flow through the main valve port, (l) bleed means communicating with the second chamber portion for bleeding the high pressure from the second chamber portion for regulating the main valve means, (m) means selectively closing the bleed means for retaining the high pressure in the second chamber portion for closing of the main valve port by the main valve means, (n) second bleed means bypassing the pilot valve means and interconnecting the high pressure outlet of the compressor and the second chamber portion, the second bleed means providing high pressure to the second chamber portion when the pilot valve means is closed.

2. A pilot-operated pressure regulator valve in a refrigeration system having a compressor, a condensor, an expansion valve and an evaporator connected in series, comprising:

(a) a body having an inlet and an outlet interconnected by a passage for flow therethrough, the body inlet being connected to the outlet of the evaporator and the body outlet being connected to the inlet of the compressor, (b) a main valve seat defining a main valve port in the passage, (c) the valve body being provided with a chamber at one side of the main valve port, (d) a main valve means movably mounted in the chamber for movement toward or away from the main valve seat to control flow through the main valve port, and subject to the pressure at the body inlet through the main valve port, the main valve means dividing the chamber into a first portion communicating with the main valve port on one side of the main valve means and a second portion on the opposite side of the main valve means from the main valve port, (e) a first spring means tending to urge the main valve means toward an open position relative to the main valve port, (f) a pilot valve seat defining a pilot valve port communicating with the second chamber portion, (g) a pilot valve means movably mounted for movement toward or away from the pilot valve seat to control flow through the pilot valve port, (h) a flexible motor element operatively connected to the pilot valve means for moving the pilot valve means, (i) a second spring means subjecting one side of the flexible motor element to a predetermined pressure and tending to move the pilot valve means to an open position relative to the pilot valve port, (j) means subjecting the other side of the flexible motor element to a pressure of the refrigerant upstream of the main valve port, and tending to move the pilot valve means to a closed position relative to the pilot valve port, (k) means connecting the high pressure outlet of the compressor to the second chamber portion on the said opposite side of the main valve means through the pilot valve port for actuating the main valve means to control flow through the main valve port, (l) bleed means communicating with the second chamber portion for bleeding the high pressure from the second chamber portion for regulating the main valve means, (m) means selectively closing the bleed means for retaining the high pressure in the second chamber portion for closing of the main valve port by the main valve means, (n) second bleed means interconnecting the high pressure outlet of the compressor and the second chamber portion, the second bleed means providing high pressure to the second chamber portion when the pilot valve means is closed, (o) the second bleed means constitutes a passage bypassing the pilot valve port when the pilot valve port is closed by the pilot valve means.

3. A pilot-operated pressure regulator valve as defined in claim 2, in which:

(p) the passage of the second bleed means is in the pilot valve seat.

4. A pilot-operated modulating and shut-off valve for regulating pressure in a refrigeration system having a compressor, a condensor, an expansion valve and an evaporator connected in series, comprising:

(a) a fluid pressure-actuated main valve, (b) a pilot valve responsive to the refrigeration system pressure being regulated for supplying the actuating pressure to the main valve, (c) means for bleeding the fluid actuating pressure from the main valve, (d) a bleed shut-off means for selectively stopping the bleeding of fluid actuating pressure from the main valve for shutting off the main valve, and (e) means, bypassing the pilot valve, supplying fluid actuating pressure to the main valve when the bleed shut-off means is closed for maintaining the main valve closed.

* * * * *